US008529801B2

(12) United States Patent
Choi et al.

(10) Patent No.: US 8,529,801 B2
(45) Date of Patent: Sep. 10, 2013

(54) NEGATIVE ACTIVE MATERIAL FOR RECHARGEABLE LITHIUM BATTERY, AND NEGATIVE ELECTRODE FOR RECHARGEABLE LITHIUM BATTERY, AND RECHARGEABLE LITHIUM BATTERY INCLUDING SAME

(75) Inventors: Nam-Soon Choi, Yongin-si (KR); Jea-Woan Lee, Yongin-si (KR); Kyoung-Han Yew, Yongin-si (KR); Sung-Soo Kim, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 909 days.

(21) Appl. No.: 12/243,319

(22) Filed: Oct. 1, 2008

(65) Prior Publication Data

US 2009/0087748 A1 Apr. 2, 2009

(30) Foreign Application Priority Data

Oct. 2, 2007 (KR) ........................ 10-2007-0099311

(51) Int. Cl.
*H01B 1/12* (2006.01)
(52) U.S. Cl.
USPC ............ 252/519.33; 252/519.14; 252/519.31; 252/519.34; 429/231.5; 429/218.1; 429/231.95
(58) Field of Classification Search
USPC ............. 252/519.33, 519.14, 519.31, 519.34; 429/231.5, 218.1, 231.95
See application file for complete search history.

(56) References Cited

U.S. PATENT DOCUMENTS

| 3,957,533 | A | | 5/1976 | Mead et al. | |
|---|---|---|---|---|---|
| 4,599,383 | A | * | 7/1986 | Satoji ............................ | 525/180 |
| 5,348,818 | A | * | 9/1994 | Asami et al. ................... | 429/213 |
| 7,638,243 | B2 | | 12/2009 | Xu et al. | |
| 2007/0128517 | A1 | | 6/2007 | Christensen et al. | |
| 2007/0172736 | A1 | * | 7/2007 | Fujikawa et al. ............. | 429/233 |
| 2007/0178376 | A1 | * | 8/2007 | Fujikawa et al. ............. | 429/144 |
| 2007/0190407 | A1 | | 8/2007 | Fujikawa et al. | |
| 2007/0196738 | A1 | | 8/2007 | Ohata et al. | |
| 2009/0176160 | A1 | * | 7/2009 | Newman ....................... | 429/248 |
| 2009/0286147 | A1 | * | 11/2009 | Nakajima et al. ............. | 429/145 |
| 2011/0232761 | A1 | * | 9/2011 | Lomasney ..................... | 136/262 |

FOREIGN PATENT DOCUMENTS

| CN | 1658411 | A | | 8/2005 |
|---|---|---|---|---|
| CN | 1663065 | | | 8/2005 |
| CN | 101044394 | A | | 9/2007 |
| EP | 1947714 | A1 | | 7/2008 |
| JP | 07-220759 | A | | 8/1995 |
| JP | 11126612 | A | * | 5/1999 |
| JP | 2001233974 | A | * | 8/2001 |
| JP | 2005-026203 | A | | 1/2005 |
| JP | 2005297448 | A | * | 10/2005 |
| JP | 2006-032325 | A | | 2/2006 |
| JP | 2006289657 | A | * | 10/2006 |
| JP | 2007-095563 | A | | 4/2007 |
| JP | 2007084808 | A | * | 4/2007 |
| KR | 2005-27224 | | | 3/2005 |
| KR | 10-2006-0001719 | A | | 1/2006 |
| KR | 10-2006-0030898 | A | | 4/2006 |
| KR | 10-2007-0030487 | A | | 3/2007 |
| WO | WO 02/061872 | A1 | | 8/2002 |
| WO | WO 2007/094641 | A1 | | 8/2007 |
| WO | WO 2007107519 | A1 | * | 9/2007 |
| WO | WO 2008105036 | A1 | * | 9/2008 |

OTHER PUBLICATIONS

CAS reg. No. 31694-16-3, Nov. 16, 1984.*
M. Winter et al., Insertion Electrode Materials for Lithium Batteries, Advanced Materials, 1998, pp. 728-763, vol. 10 No. 10, Wiley-VCH Verlag GmdH, Weinheim.
Extended European Search Report for Application No. 08169976.1; Applicant: Samsung SDI Co., Ltd., 10 pgs; dated Feb. 25, 2009.
S.S. Zhang et al., Enhanced Performance of Natural Graphite in Li-ion Battery by Oxalatoborate Coating, Journal of Power Sources, 2003, 275-279, vol. 129 (2004) Elsevier B.V.
KIPO Office Action dated Feb. 26, 2010 for Korean application 10-2008-0015839, priority to U.S. Appl. No. 12/182,013.
SIPO Office Action dated Oct. 12, 2010 in Chinese Application No. 200810160898.3.
Office Action dated Mar. 26, 2013, recieved in connection with Chinese Patent Application No. 201110065495.2.

* cited by examiner

*Primary Examiner* — Douglas McGinty
(74) *Attorney, Agent, or Firm* — Knobbe Martens Olson & Bear, LLP

(57) ABSTRACT

A negative active material of a negative electrode of a rechargeable lithium battery, the negative active material including a metallic active material core and a polymer, having a tensile strength of at least 40 MPa, coated on particles of the metallic active material. The polymer controls the volumetric expansion of the negative active material and enhances the cycle-life characteristics of the battery.

21 Claims, 4 Drawing Sheets

NEGATIVE ACTIVE MATERIAL FOR RECHARGEABLE LITHIUM BATTERY, AND NEGATIVE ELECTRODE FOR RECHARGEABLE LITHIUM BATTERY, AND RECHARGEABLE LITHIUM BATTERY INCLUDING SAME

CROSS-REFERENCE TO RELATED APPLICATION

This application claims the benefit of Korean Patent Application No. 2007-99311, filed in the Korean Intellectual Property Office on Oct. 2, 2007, the disclosure of which is incorporated herein by reference.

BACKGROUND OF THE INVENTION

1. Field of the Invention

Aspects of the present invention relate to a negative active material, a negative electrode including the negative active material, and a rechargeable lithium battery including the negative electrode.

2. Description of the Related Art

Lithium rechargeable batteries have recently drawn attention as power sources of portable electronic devices. They use an organic electrolyte solution and have twice the discharge voltage and a higher energy density, than a conventional battery using an alkali aqueous solution. For positive active materials of a rechargeable lithium battery, lithium-transition element composite oxides that can intercalate lithium, such as $LiCoO_2$, $LiMn_2O_4$, $LiNiO_2$, $LiNi_{1-x}Co_xO_2$ (0<x<1), $LiMnO_2$, and the like, have been researched.

As for negative active materials of a rechargeable lithium battery, various carbon-based materials, such as artificial graphite, natural graphite, and hard carbon, which can all intercalate and deintercalate lithium ions, have been used. Graphite increases the discharge voltage and energy density of a battery, because it has a lower discharge potential of −0.2V, as compared to lithium. A battery using graphite as a negative active material has a high average discharge potential of 3.6V and an excellent energy density. Furthermore, graphite is the most comprehensively used material, among the aforementioned carbon-based materials, since graphite guarantees a better cycle-life for a battery, due to its outstanding reversibility. However, a graphite active material has a low density, and consequently, a low capacity in terms of energy density per unit volume. Further, graphite is likely to react with an organic electrolyte at a high discharge voltage, which can lead to battery combustion or explosion.

In order to solve these problems, a great deal of research on oxide negative active materials has recently been performed. For example, amorphous tin oxide developed by Fuji Film Co., Ltd. Japan has a high capacity per weight (800 mAh/g). However, this oxide has resulted in some critical defects, such as a high initial irreversible capacity of up to 50%. Furthermore, the tin oxide tends to be reduced into tin metal during the charge or discharge reactions, which reduces its acceptance for use in a battery.

Referring to another oxide negative electrode, a negative active material of $Li_aMg_bVO_c$ (0.05≦a≦3, 0.12≦b≦2, 2≦2c-a-2b≦5) is disclosed in Japanese Patent Publication 2002-216753. The characteristics of a rechargeable lithium battery including $Li_{1.1}V_{0.9}O_2$ were also presented in the 2002 Japanese Battery Conference (Preview No. 3B05). However, such an oxide negative electrode does not show sufficient battery performance, and therefore, there is ongoing research into other oxide negative materials.

SUMMARY OF THE INVENTION

One exemplary embodiment of the present invention provides a negative active material that improves the cycle-life characteristics of a rechargeable lithium battery.

As used herein, when specific definition is not provided, the term "coat" refers to partially or entirely disposed on the surface of subject.

Another exemplary embodiment of the present invention provides a negative electrode including the negative active material, and a rechargeable lithium battery including the negative electrode. The negative active material includes a metallic active material and a high strength polymer, having a tensile strength of at least 40 MPa, coated on particles of the metallic active material.

According to aspects of the present invention, the metallic active material may include lithium metal, a metal capable of alloying with lithium, a lithium alloy, a metal or semi-metal that is reversibly capable of doping and dedoping with lithium or that is reversibly capable of forming a lithium-containing compound, or a combination thereof.

According to aspects of the present invention, the metallic active material may be transition metal oxide, or oxides of the above metallic materials.

According to aspects of the present invention, the metallic active material may be selected from the group consisting of a lithium vanadium-based oxide, a tin oxide ($SnO_x$, 0≦x≦2), a silicon oxide ($SiO_x$, 0<x<2), a phosphorus oxide, and a combination thereof.

According to aspects of the present invention, the high strength polymer has a tensile strength ranging from 40 to 200 MPa.

According to aspects of the present invention, the high strength polymer can be a compound of the following Formulae 2 to 5:

[Chemical Formula 2]

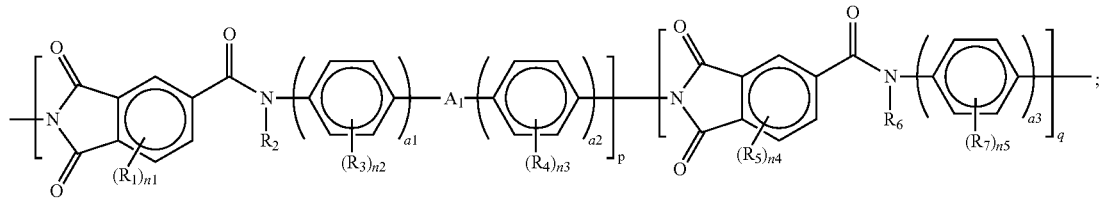

-continued

[Chemical Formula 3]

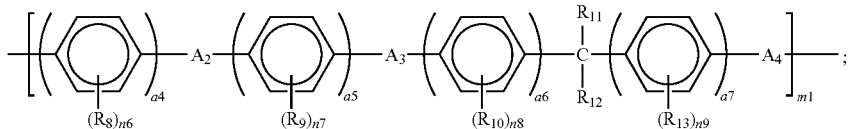

[Chemical Formula 4]

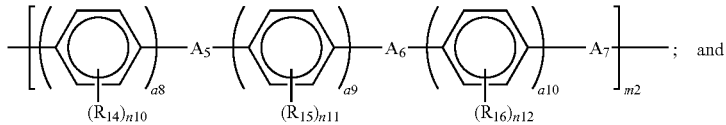
; and

[Chemical Formula 5]

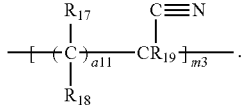

In the Formulae 2 to 5: R1 to R19 are independently selected from the group consisting of hydrogen, an alkyl, a haloalkyl, an alkoxy, acrylic acid including Li or Na, an aryl, and a halogen; A1 to A7 are independently selected from the group consisting of O, CO, $SO_2$ and CR41R42, where R41 and R42 are independently an alkyl, a haloalkyl, or phenyl, n1 and n4 are independently from 1 to 3, n2, n3, and n5 to n12 are independently 1 to 4, a1 to a11 are independently from 1 to 5, p and q independently range from 0.01 to 0.99, and m1 to m3 independently range from 100 to 10,000.

According to aspects of the present invention, the polymer can be an amic acid compound produced by the imidization of a dianhydride compound and a diamine compound. The dianhydride compound may be selected from the group consisting of the following compounds of Formulae 6 to 9:

[Chemical Formula 6]

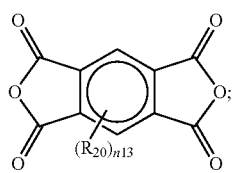

[Chemical Formula 7]

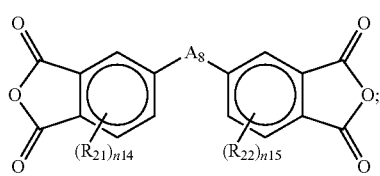

[Chemical Formula 8]

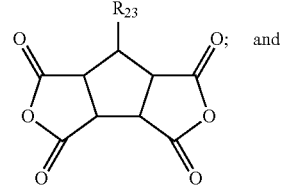
; and

[Chemical Formula 9]

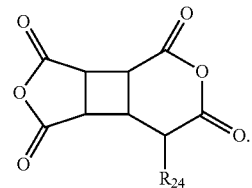

In the above Formulae 6 to 9: $R_{20}$ to $R_{24}$ are independently selected from the group consisting of hydrogen, an alkyl, a haloalkyl, an alkoxy, an acrylic acid including Li or Na, an aryl, and a halogen; $A_8$ is selected from the group consisting of O, CO, $SO_2$ and $CR_{41}R_{42}$, where $R_{41}$ and $R_{42}$ are independently an alkyl, a haloalkyl, or a phenyl; $n_{13}$ ranges 1 to 2; and $n_{14}$ and $n_{15}$ independently range from 1 to 3.

According to aspects of the present invention, the diamine compound may be selected from the group consisting of the compounds of the following Formulae 10 to 15:

[Chemical Formula 10]

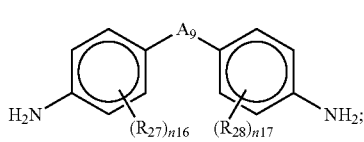

[Chemical Formula 11]

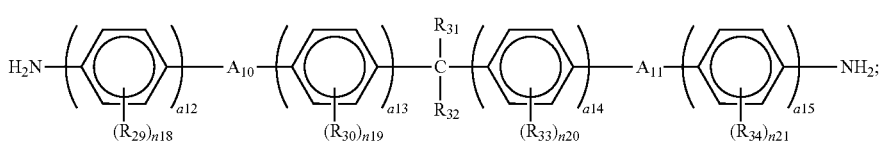

-continued

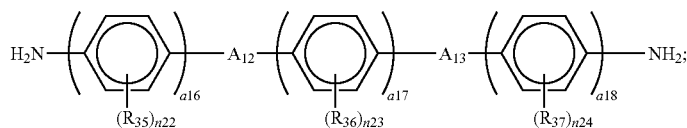

[Chemical Formula 12]

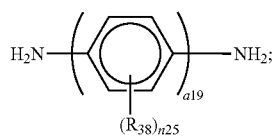

[Chemical Formula 13]

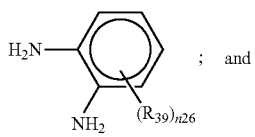  ; and

[Chemical Formula 14]

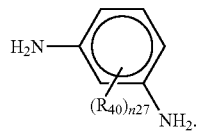

[Chemical Formula 15]

In the above Formulae 10 to 15: $R_{27}$ to $R_{40}$ are independently selected from the group consisting of hydrogen, an alkyl, a haloalkyl, an alkoxy, an acrylic acid including Li or Na, an aryl, and a halogen; $A_9$ to $A_{13}$ are independently selected from the group consisting of O, CO, $SO_2$ and $CR_{41}R_{42}$, where $R_{41}$ and $R_{42}$ are independently an alkyl, a haloalkyl, or phenyl; $n_{16}$ to $n_{27}$ are independently 1 to 4; and $a_{12}$ to $a_{19}$ independently range from 1 to 100.

According to aspects of the present invention, the high strength polymer has a weight average molecular weight ranging from 10,000 to 1,000,000.

According to aspects of the present invention, the negative active material includes from 0.1 to 2 wt % of the high strength polymer. The negative active material has a volume expansion ratio ranging from 15 to 40 volume %, with respect to an initial volume of the negative active material before charging and discharging. The polymer is coated on particles of the metallic active material to an average thickness ranging from 1 to 100 nm. The negative active material may further include a conductive material coated on the metallic active material particles.

According to another exemplary embodiment of the present invention, provided is a negative electrode for a rechargeable lithium battery that includes a current collector and a negative active material layer disposed on the current collector. The negative active material layer includes a negative active material and a binder. The negative active material includes a metallic active material and a polymer having a tensile strength of at least 40 MPa, coated on particles of the metallic active material.

According to yet another exemplary embodiment of the present invention, provided is a rechargeable lithium battery that includes: the above negative electrode; a positive electrode including a positive active material capable of reversibly intercalating lithium ions; and an electrolyte.

According to aspects of the present invention, the volume expansion of the negative active material is effectively suppressed, since the metallic active material particles are coated with a high strength polymer. Accordingly, the cycle-life characteristics of a battery can be improved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
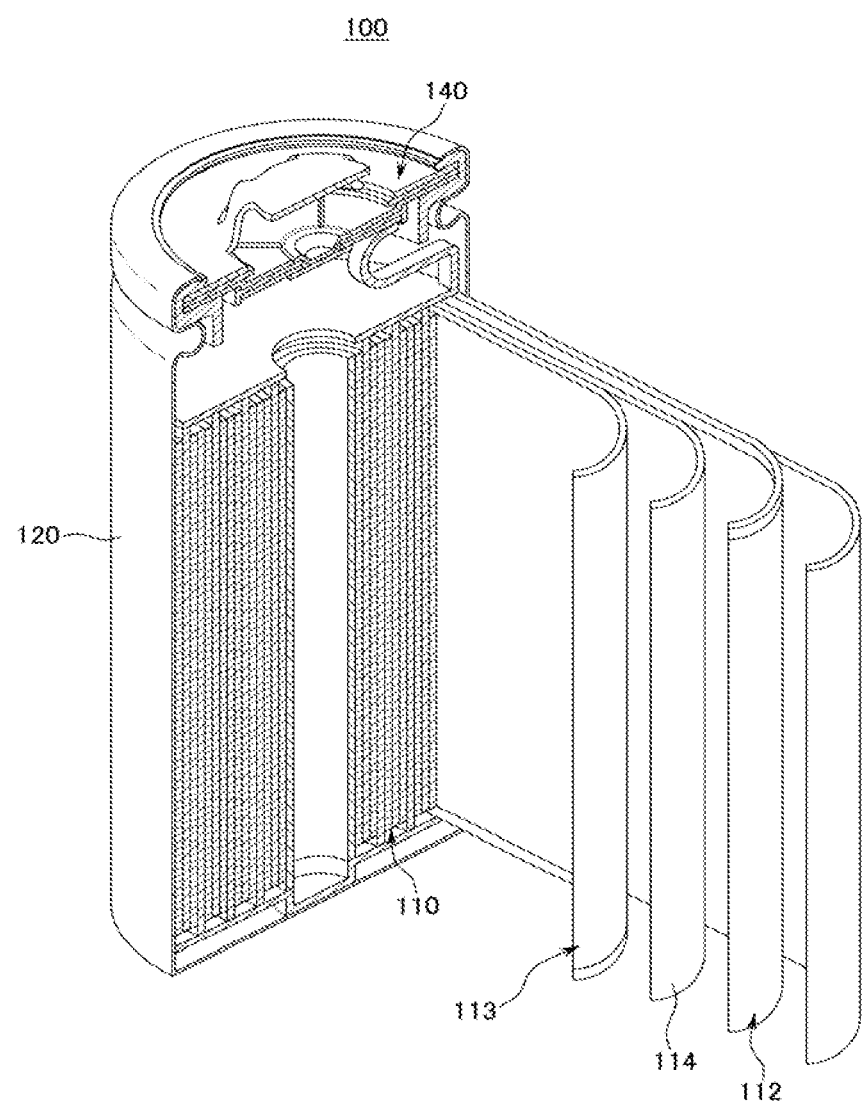
FIG. 1 is a schematic cross-sectional view showing a lithium rechargeable battery, according to one exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Aspects of the present invention relate to a negative active material for a rechargeable lithium battery. Recently, as demands for a high-capacity battery have increased, high capacity metallic negative active materials have been researched. However, in a case of a metallic negative active material, the volume of negative active material is repeatedly expanded and contracted, due to the repeated intercalation and deintercalation of lithium ions, during charging and discharging. As cracks are generated in the active material, the cycle-life characteristics and the electroconductivity, thereof, are degraded.

According to aspects of the present invention, provided is a negative active material that has a reduced volume change, during charging and discharging. The negative active material provides improved cycle-life characteristics and electro-conductivity, and prevents an electrolyte from being squeezed out of an electrode.

A negative active material, according to one exemplary embodiment of the present invention, includes a metallic active material and a polymer having a tensile strength of at least 40 MPa, coated on particles of the metallic active material.

The metallic active material may include lithium metal, a metal capable of alloying with lithium, a lithium alloy, a metal or semi-metal that is reversibly capable of doping and dedoping with lithium or that is reversibly capable of forming a lithium-containing compound, or a combination thereof. The metallic active material may include an oxide of the aforementioned materials.

The metal capable of alloying with lithium may be at least one selected from the group consisting of Na, K, Rb, Cs, Fr, Be, Mg, Ca, Sr, Ba, Ra, Al, Fe, and a combination thereof. The metal or semi-metal that is reversibly capable of doping and dedoping with lithium or that is reversibly capable of forming a lithium-containing compound may be at least one selected from the group consisting of tin, titanium nitrate, silicon, phosphorus, and a combination thereof.

The metal oxide can include a transition metal oxide. The metal oxide may be selected from the group consisting of lithium vanadium-based oxide, tin oxide ($SnO_x$, $0 \leq x \leq 2$), silicon oxide ($SiO_x$, $0 < x < 2$), phosphorus oxide, and a combination thereof.

According to aspects of the present invention, the active material can have the following Chemical Formula 1:

$Li_xM_yV_zO_{2+d}$. [Chemical Formula 1]

In Chemical Formula 1, $0.1 \leq x \leq 2.5$, $0 \leq y \leq 0.5$, $0.5 \leq z \leq 1.5$, $0 \leq d \leq 0.5$, and M is selected from the group consisting of Al, Cr, Mn, Fe, Co, Ni, Cu, Zn, Zr, Nb, Mo, W, Ag, Sn, Ge, Si, Ti, and a combination thereof. According to one exemplary embodiment, a metal selected from the group consisting of Al, Cr, Mo, Ti, W, Zr, and a combination thereof, is appropriate for the M. A high strength polymer, having a tensile strength of at least 40 MPa, is coated on particles of the metallic active material.

According to one exemplary embodiment, the polymer has a tensile strength of from 40 to 200 MPa. According to another embodiment, the polymer has a tensile strength of from 50 to 150 MPa. If the polymer has a tensile strength ranging from 40 to 200 MPa, the polymer can effectively suppress the expansion of the negative active material. When it is less than 40 MPa, it may not sufficiently suppress the volume expansion of the negative active material.

The polymer can be a compound of the following Chemical Formulae 2 to 5 or compounds produced by an imidization reaction (S2: dehydration reaction) of an amic acid obtained from a reaction (S1) between a dianhydride compound and a diamine compound:

[Chemical Formula 2]
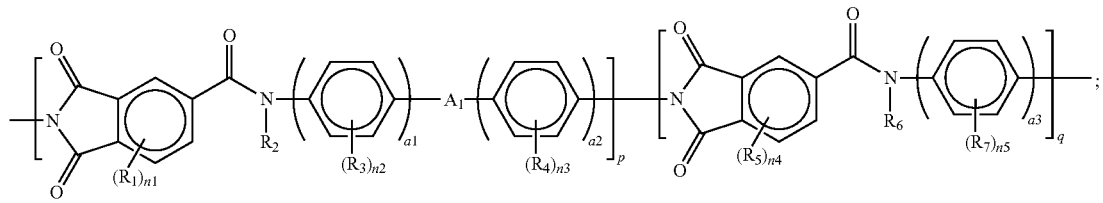

[Chemical Formula 3]
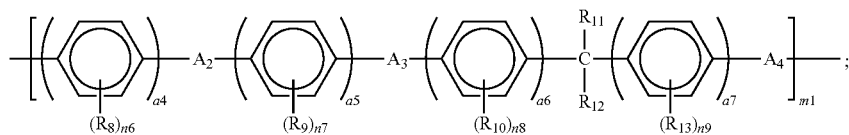

[Chemical Formula 4]
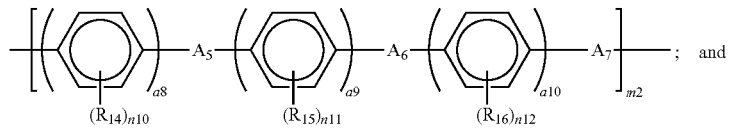
; and

[Chemical Formula 5]
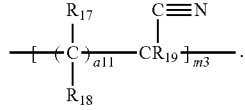

In the Formulae 2 to 5: $R_1$ to $R_{19}$ are independently selected from the group consisting of hydrogen, an alkyl, a haloalkyl (an alkyl including a halogen such as such as F, Cl, Br, or I), an alkoxy, acrylic acid including Li or Na, an aryl, and a halogen such as F, Cl, Br, or I; $A_1$ to $A_7$ are independently selected from the group consisting of O, CO, $SO_2$ and $CR_{41}R_{42}$, where $R_{41}$ and $R_{42}$ are independently an alkyl, a haloalkyl (an alkyl including a halogen such as such as F, Cl, Br, or I) such as $C(CF_3)_2$, or a phenyl; $n_1$ and $n_4$ are independently from 1 to 3; $n_2$, $n_3$ and $n_5$ to $n_{12}$ are independently from 1 to 4; $a_1$ to $a_{11}$ are independently from 1 to 5; p and q independently range from 0.01 to 0.99; and $m_1$ to $m_3$ independently range from 100 to 10,000.

According to one exemplary embodiment, $R_1$ to $R_{19}$ are independently selected from the group consisting of hydrogen, an alkyl, a fluoroalkyl, an alkoxy, acrylic acid including Li or Na, a benzyl, and a halogen. According to another exemplary embodiment, $R_1$ to $R_{19}$ are independently selected from the group consisting of hydrogen, an alkyl, and a benzyl. According to one exemplary embodiment, $A_1$ to $A_7$ are independently selected from the group consisting of O, CO, $SO_2$, and $C(CF_3)_2$ According to one exemplary embodiment, $n_1$ and $n_4$ are independently from 1 to 3, and $n_2$, $n_3$, and $n_5$ to $n_{12}$ are independently from 1 to 4. According to one exemplary embodiment, $a_1$ to $a_{11}$ are independently from 1 to 5. According to another embodiment, $a_1$ to $a_{11}$ are independently from 1 to 3. According to yet another embodiment, $a_1$ to $a_{11}$ are independently from 1 to 2. According to one embodiment, p and q independently range from 0.1 to 0.9. According to one embodiment, $m_1$ to $m_3$ independently range from 1000 to 5000.

Specific examples of the repeat units of the above Chemical Formulae 2 to 5 are a polyamide imide-based polymer of the following Formula 16, polysulfone-based polymer of the following Chemical Formula 17, a polyoxysulfone-based polymer of the following Chemical Formula 18, and a polyacrylonitrile-based polymer:

[Chemical Formula 16]

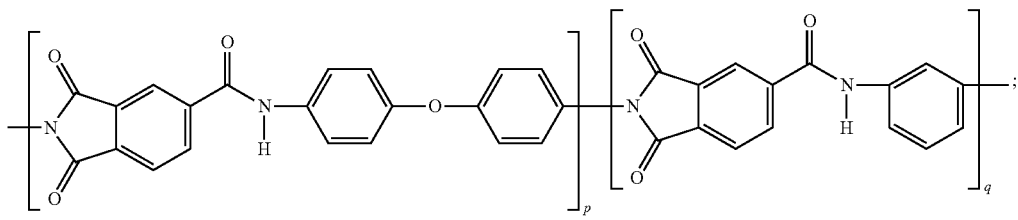

[Chemical Formula 17]

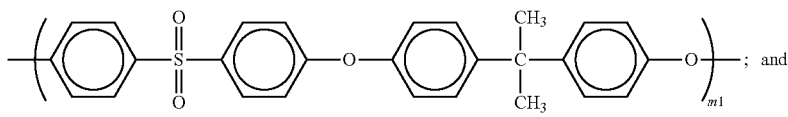; and

[Chemical Formula 18]

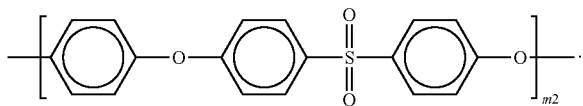.

In the above Chemical Formulae 16 to 18, p ranges from 0.01 to 0.99, q ranges from 0.01 to 0.99, and $m_1$ and $m_2$ are independently from 100 to 10,000. According to one embodiment, p and q independently range from 0.1 to 0.9. According to one embodiment, $m_1$ and $m_2$ independently range from 1000 to 5000.

Alternatively, the polymer may be synthesized by an imidization reaction between at least one dianhydride compound of the following Chemical Formulae 6 to 9 and at least one diamine compound of the following Chemical Formulae 10 to 15. The imidization reaction refers to reaction between the COOH of the dianhydride compound of the CON of the diamine compound, to form a CON—CO cycle. Chemical Formulae 6 to 15 are as follows:

[Chemical Formula 6]

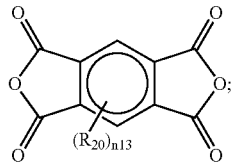

[Chemical Formula 7]

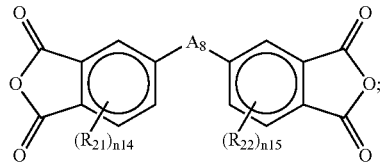

[Chemical Formula 8]

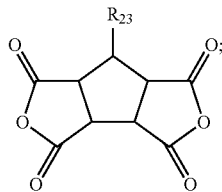

[Chemical Formula 9]

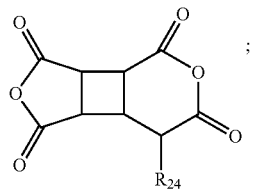

[Chemical Formula 10]

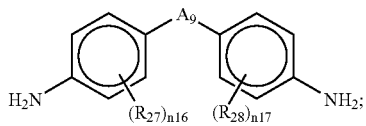

[Chemical Formula 11]

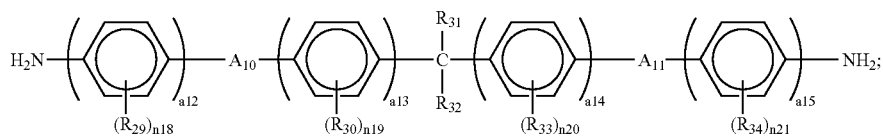

[Chemical Formula 12]

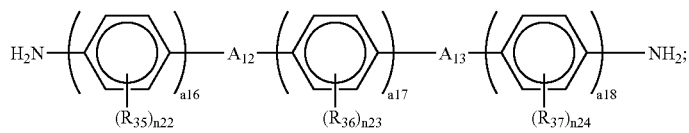

[Chemical Formula 13]

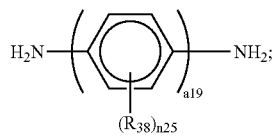

[Chemical Formula 14]

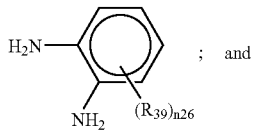

[Chemical Formula 15]

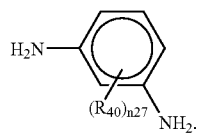

In the above Chemical Formulae 6 to 15, $R_{20}$ to $R_{24}$ and $R_{27}$ to $R_{40}$ are independently selected from the group consisting of hydrogen, an alkyl, a haloalkyl, an alkoxy, acrylic acid including Li or Na, an aryl, and a halogen selected from F, Cl, Br, and I. In one embodiment, $R_{20}$ to $R_{40}$ are independently selected from the group consisting of hydrogen, an alkyl, a fluoroalkyl, an alkoxy, acrylic acid including Li or Na, a benzyl, and a halogen. In another embodiment, $R_{20}$ to $R_{40}$ are independently selected from the group consisting of hydrogen, an alkyl, and fluoroalkyl. $A_8$ to $A_{13}$ are independently selected from the group consisting of O, CO, $SO_2$, and $CR_{41}R_{42}$, where $R_{41}$ and $R_{42}$ are independently an alkyl, a haloalkyl, or phenyl. In one embodiment, $A_8$ to $A_{13}$ are independently selected from the group consisting of O, CO, and $SO_2$, $n_{13}$ ranges 1 to 2, $n_{14}$ and $n_{15}$ are independently from 1 to 3, $n_{16}$ to $n_{27}$ are independently from 1 to 4, and $a_{12}$ to $a_{19}$ are independently from 1 to 100. In one embodiment $a_{12}$ to $a_{19}$ are independently from 1 to 20.

In the Chemical Formulae of the present invention: an alkyl refers to a $C_1$ to $C_7$ alkyl, or a $C_1$ to $C_3$ alkyl; a haloalkyl refers to a $C_1$ to $C_7$ haloalkyl, or a $C_1$ to $C_3$ haloalkyl; a alkoxy refers to a $C_1$ to $C_7$ alkoxy, or a $C_1$ to $C_3$ alkoxy; and an aryl refers to a $C_6$ to $C_{18}$ aryl, or a $C_6$ to $C_{12}$ aryl.

Examples of the dianhydride compounds represented by the above Formulae 6 to 9 include: pyromellitic dianhydride (PMDA) of the Formula 19; 4,4'-oxydiphthalic dianhydride (OPDA) of Chemical Formula 20; benzophenonetetracarboxylic dianhydride (BTDA) of Chemical Formula 21; 3,4', 4,4'-diphenylenesulfonetetracarboxylic dianhydride (DSDA) of Chemical Formula 22; 1,2,3,4-cyclopentanetetracarboxylic dianhydride (CPDA) of Chemical Formula 23; and 2,3,5-tricarboxylcyclobutyl dianhydride of Chemical Formula 24, as follows:

[Chemical Formula 19]

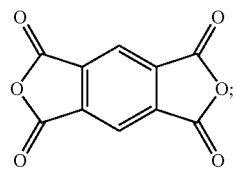

[Chemical Formula 20]

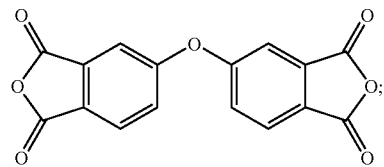

[Chemical Formula 21]

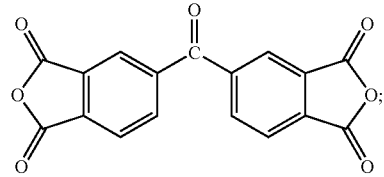

[Chemical Formula 22]

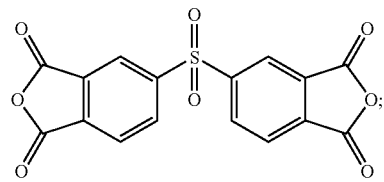

[Chemical Formula 23]

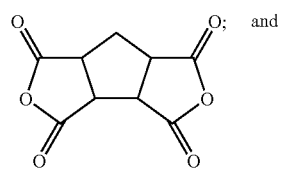

[Chemical Formula 24]

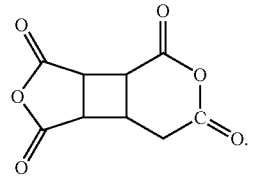

Examples of the diamine compounds represented by the above Formulae 10 to 15 include 4,4-oxyaniline of Chemical Formula 25, hexafluoro-2,2-bis (4,4-aminophenoxyphenyl) propane of Chemical Formula 26, triphenyletherdiamine (TPE) of Chemical Formula 27, phenylenediamine such as 1,3-phenylenediamine of Chemical Formula 28, and 1,4-phenylenediamine of Chemical Formula 29, as follows.

The following Reaction Scheme 1 shows a reaction to obtain an amic acid (S1), by reacting 4,4-oxydiphthalic dianhydride and 4,4-oxyaniline, and then a imidization raction (S2) of the amic acid to obtain a high strength polymer.

[Reaction Scheme 1]

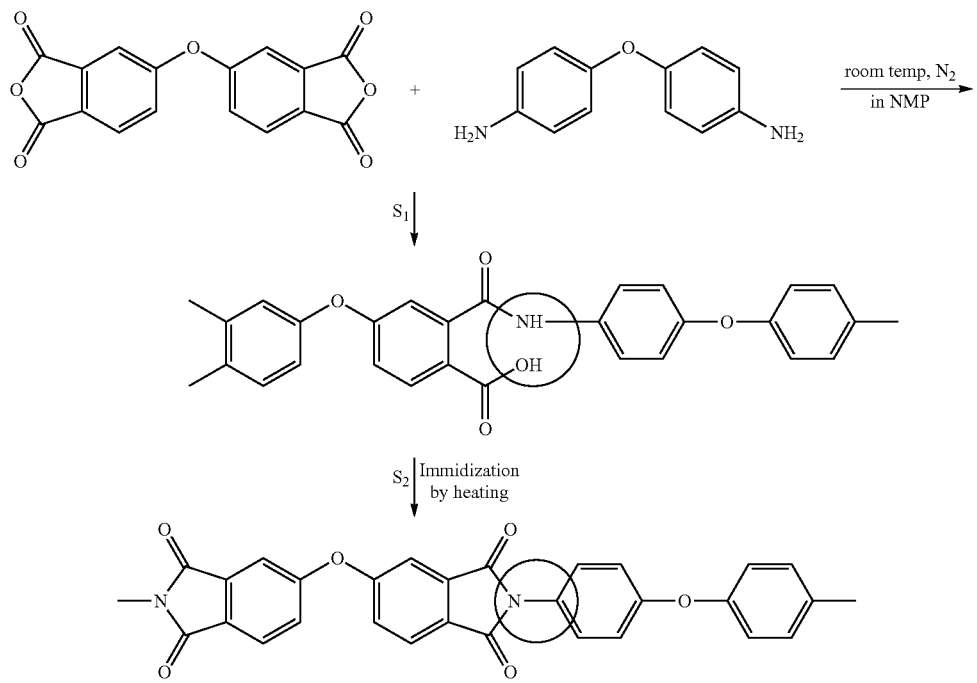

[Chemical Formula 25]

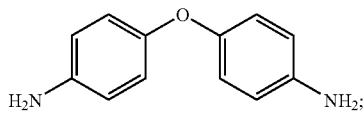

[Chemical Formula 26]

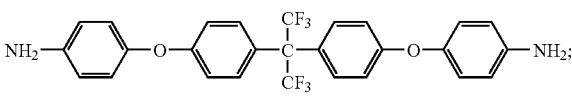

[Chemical Formula 27]

[Chemical Formula 28]

and

[Chemical Formula 29]

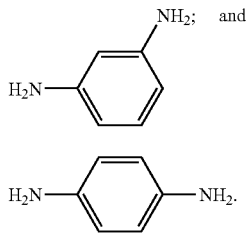

Referring to Reaction Scheme 1, the imidization reaction is performed by mixing the dianhydride compound and the diamine compound, in an appropriate solvent, and heating the mixture, thereby synthesizing the resultant polyimide-based polymer. The appropriate solvent and heating temperature are well-known in the art, and therefore, a detailed description thereof, is not provided.

According to one exemplary embodiment of the present invention, the high strength polymer has a weight average molecule weight ranging from 10,000 to 1,000,000. According to another embodiment, it ranges from 100,000 to 600,000. Within the ranges, the polymer has excellent dissolubility and mechanical strength. On the other hand, when out of the ranges, the dissolubility and/or mechanical tensile strength thereof, may be reduced.

The polymer may be coated on particles of the metallic active material, by any method that does not reduce properties of an active material, such as spray coating or dipping. These coating methods are well-known in this art, and thus a detailed description is not provided.

According to one exemplary embodiment, the thickness of a surface-treatment layer including the polymer ranges from 1 to 100 nm. According to another exemplary embodiment, it ranges from 5 to 100 nm. According to a further exemplary embodiment, it ranges from 10 to 50 nm. If the thickness is within the ranges, it can minimize the volume change of the negative active material, while charging and discharging and can minimize the side reactions that occur at the interface between the electrolyte and negative active material. On the other hand, if the thickness is out of the ranges, the battery resistance may be excessively increased, so as to inhibit the transmission of lithium ions and electrons.

The surface-treatment layer may further include a conductive agent to improve the conductivity of the surface-treatment layer. Any electrically conductive material can be used, unless it causes a chemical change. Examples of the conductive material include: carbonaceous materials, such as natural graphite, artificial graphite, carbon black, acetylene black, ketjen black, and carbon fiber; a metal powder or fiber including copper, nickel, aluminum, silver, and the like; or a conductive polymer such as a polyphenylene derivative. According to one exemplary embodiment, a carbonaceous material may be appropriate for the conductive material.

According to one exemplary embodiment, the negative active material includes 0.1 to 2 wt % of a high strength polymer. According to another embodiment, it ranges from 0.1 to 1 wt %. If the amount of high strength polymer is within the ranges, the high strength polymer is uniformly coated on the metallic active material surface, so it can control the volume expansion of negative active material. On the other hand, when it is out of the ranges, the surface-treatment layer may be excessively thick, so the battery resistance is increased.

According to one exemplary embodiment, the surface of the active material core is coated with a high strength polymer, so that the volume expansion of the negative active material is effectively suppressed during charging. According to one exemplary embodiment, the volume expansion rate of the negative active material ranges from 15 to 40 volume %, with respect to an initial volume of the negative active material. According to another exemplary embodiment, it ranges from 15 to 30 volume %. According to a further exemplary embodiment, it ranges from 15 to 20 volume %. When the volume expansion rate of the negative active material is within any of the ranges, an electro-conductive path is maintained in the electrode, so that battery resistance is not increased. Therefore, the battery cycle-life characteristics are improved, and a battery deforming phenomenon is minimized.

The negative electrode for a rechargeable lithium battery, according to another embodiment of the present invention, includes a current collector and a negative active material layer disposed on the current collector. The negative active material layer includes the above metallic active material.

The metallic active material can be included in an amount of from 80 to 99 wt %, based on the total weight of the negative active material layer. According to one embodiment, the metallic active material is included in an amount of 85 to 97 wt %, based on the total weight of the negative active material layer. When the metallic active material is included in an amount out of the ranges, a battery capacity may be reduced, or the relative amount of binder is reduced, and thereby, the adherence between the negative active material layer and a current collector may be degraded.

The negative electrode can be fabricated as follows: a negative active material composition is prepared by mixing a metallic active material, a binder, and optionally a conductive agent, and then the composition is applied on a negative current collector, such as a copper current collector. The negative electrode manufacturing method is well known, and thus, it is not described in detail in the present specification.

Examples of the binder include the above high strength polymer, polyvinylalcohol, carboxylmethyl cellulose, hydroxypropy cellulose, diacetylene cellulose, polyvinylchloride, polyvinylpyrrolidone, polytetrafluoroethylene, polyvinylidene fluoride, polyethylene, and polypropylene.

Any electrically conductive material can be used as a conductive agent, unless it causes a chemical change. Examples of the conductive agent include natural graphite, artificial graphite, carbon black, acetylene black, ketjen black, denka black, carbon fiber, a metal powder or fiber including copper, nickel, aluminum, silver, and the like, and a polyphenylene derivative.

The solvent can be N-methylpyrrolidone, but it is not limited thereto. The current collector may be selected from the group consisting of a copper foil, a nickel foil, a stainless steel foil, a titanium foil, a nickel foam, a copper foam, a polymer substrate coated with a conductive metal, and a combination thereof.

According to one exemplary embodiment, the negative electrode has a volume expansion rate ranging from 10 to 30 volume %, with respect to a thickness of the negative electrode. According to another embodiment, it ranges from 10 to 20 volume %. If it is within any of the ranges, the electroconduction path is maintained in the electrode, and a battery resistance is not increased. Therefore, the battery cycle-life characteristics are improved, and the battery deforming phenomenon is minimized.

A rechargeable lithium battery, according to one embodiment of the present invention, includes a negative electrode including the negative active material, a positive electrode, and an electrolyte. The positive electrode may include a positive active material, for example a compound that is capable of reversibly intercalating lithium ions. Specifically, the positive active material includes compounds of the following Chemical Formulae 30 to 53:

$$Li_aA_{1-b}B_bD_2, \qquad \text{[Chemical Formula 30]}$$

wherein, in the above formula, $0.95 \leq a \leq 1.1$ and $0 \leq b \leq 0.5$;

$$Li_aE_{1-b}B_bO_{2-c}F_c, \qquad \text{[Chemical Formula 31]}$$

wherein, in the above formula, $0.95 \leq a \leq 1.1$, $0 \leq b \leq 0.5$, and $0 \leq c \leq 0.05$;

$$LiE_{2-b}B_bO_{4-c}F_c, \qquad \text{[Chemical Formula 32]}$$

wherein, in the above formula, $0 \leq b \leq 0.5$ and $0 \leq c \leq 0.05$;

$$Li_aNi_{1-b-c}Co_bB_cD_\alpha, \qquad \text{[Chemical Formula 33]}$$

wherein, in the above formula, $0.95 \leq a \leq 1.1$, $0 \leq b \leq 0.5$, $0 \leq c \leq 0.05$, and $0 < \alpha \leq 2$:

$$Li_aNi_{1-b-c}Co_bB_cO_{2-\alpha}F_\alpha, \qquad \text{[Chemical Formula 34]}$$

wherein, in the above formula, $0.95 \leq a \leq 1.1$, $0 \leq b \leq 0.5$, $0 \leq c \leq 0.05$, and $0 < \alpha < 2$;

$$Li_aNi_{1-b-c}Co_bB_cO_{2-\alpha}F_2, \qquad \text{[Chemical Formula 35]}$$

wherein, in the above formula, $0.95 \leq a \leq 1.1$, $0 \leq b \leq 0.5$, $0 \leq c \leq 0.05$, and $0 < \alpha < 2$;

$$Li_aNi_{1-b-c}Mn_bB_cD_\alpha, \qquad \text{[Chemical Formula 36]}$$

wherein, in the above formula, $0.95 \leq a \leq 1.1$, $0 \leq b \leq 0.5$, $0 \leq c \leq 0.05$, and $0 \leq \alpha \leq 2$;

$$Li_aNi_{1-b-c}Mn_bB_cO_{2-\alpha}F_\alpha, \qquad \text{[Chemical Formula 37]}$$

wherein, in the above formula, $0.95 \leq a \leq 1.1$, $0 \leq b \leq 0.5$, $0 \leq c \leq 0.05$, and $0 < \alpha < 2$;

$$Li_aNi_{1-b-c}Mn_bB_cO_{2-\alpha}F_2, \qquad \text{[Chemical Formula 38]}$$

wherein, in the above formula, $0.95 \leq a \leq 1.1$, $0 \leq b \leq 0.5$, $0 < c \leq 0.05$, and $0 < \alpha < 2$;

$$Li_aNi_bE_cG_dO_2, \qquad \text{[Chemical Formula 39]}$$

wherein, in the above formula, $0.90 \leq a \leq 1.1$, $0 \leq b \leq 0.9$, $0 \leq c \leq 0.9$, and $0.001 \leq d \leq 0.1$;

$$Li_aNi_bCo_cMn_dGeO_2, \qquad \text{[Chemical Formula 40]}$$

wherein, in the above formula, $0.90 \leq a \leq 1.1$, $0 \leq b \leq 0.9$, $0 \leq c \leq 0.5$, $0 \leq d \leq 0.5$, and $0.001 \leq e \leq 0.1$;

$$Li_aNiG_bO_2, \quad \text{[Chemical Formula 41]}$$

wherein, in the above formula, $0.90 \leq a \leq 1.1$ and $0.001 \leq b \leq 0.1$;

$$Li_aCoG_bO_2, \quad \text{[Chemical Formula 42]}$$

wherein, in the above formula, $0.90 \leq a \leq 1.1$ and $0.001 \leq b \leq 0.1$;

$$Li_aMnG_bO_2, \quad \text{[Chemical Formula 43]}$$

wherein, in the above formula, $0.90 \leq a \leq 1.1$ and $0.001 \leq b \leq 0.1$;

$$Li_aMn_2G_bO_4, \quad \text{[Chemical Formula 44]}$$

wherein, in the above formula, $0.90 \leq a \leq 1.1$ and $0.001 \leq b \leq 0.1$;

$$QO_2; \quad \text{[Chemical Formula 45]}$$

$$QS_2; \quad \text{[Chemical Formula 46]}$$

$$LiQS_2; \quad \text{[Chemical Formula 47]}$$

$$V_2O_5; \quad \text{[Chemical Formula 48]}$$

$$LiV_2O_5; \quad \text{[Chemical Formula 49]}$$

$$LiIO_2; \quad \text{[Chemical Formula 50]}$$

$$LiNiVO_4; \quad \text{[Chemical Formula 51]}$$

$$Li_{3-f}J_3(PO_4)_3 \, (0 \leq f \leq 3); \quad \text{[Chemical Formula 52]}$$

$$Li_{3-f}Fe_2(PO_4)_3 \, (0 \leq f \leq 2). \quad \text{[Chemical Formula 53]}$$

In Chemical Formulas 30 to 53: A is selected from the group consisting of Ni, Co, Mn, and a combination thereof; B is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; F is selected from the group consisting of F, S, P, and a combination thereof; G is selected from the group consisting of Al, Cr, Mn, Fe, Mg, Sr, V, a lanthanide element, such as La, and Ce, and a combination thereof; Q is selected from the group consisting of Ti, Mo, Mn, and a combination thereof; I is selected from the group consisting of Cr, V, Fe, Sc, Y, and a combination thereof; and J is selected from the group consisting of V, Cr, Mn, Co, Ni, Cu, and a combination thereof.

The positive active material may be at least one selected from the group consisting of elemental sulfur ($S_8$), a sulfur-based compound, such as $Li_2S_n (n \geq 1)$, or $Li_2S_n (n \geq 1)$, dissolved in a catholyte; an organic sulfur compound, and a carbon-sulfur polymer (($C_2S_f)_n$: f=2.5 to 50, $n \geq 2$).

The positive electrode can be fabricated as follows: a positive active material composition is prepared by mixing a positive active material, a binder, and optionally a conductive agent, and then the composition is applied on a positive current collector, such as aluminum.

Any electrically conductive material can be used as a conductive agent, unless it causes a chemical change. Examples of the conductive agent include natural graphite, artificial graphite, carbon black, acetylene black, ketjen black, carbon fiber, a metal powder or fiber including copper, nickel, aluminum, silver, and the like, and a polyphenylene derivative.

The binder may be selected from the group consisting of polyvinylalcohol, carboxylmethyl cellulose, hydroxypropylene cellulose, diacetylene cellulose, polyvinylchloride, polyvinylpyrrolidone, polytetrafluoroethylene, polyvinylidene fluoride, polyethylene, and polypropylene, but it is not limited thereto. The solvent can be N-methylpyrrolidone, but it is not limited thereto.

In a rechargeable battery, according to one embodiment of the present invention, the electrolyte includes a non-aqueous organic solvent and a lithium salt. The non-aqueous organic solvent acts as a medium for transporting ions taking part in the electrochemical reactions of the battery. The non-aqueous organic solvent may include a carbonate-based, ester-based, ether-based, ketone-based, alcohol-based, or aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like. Examples of the ester-based solvent may include n-methyl acetate, n-ethyl acetate, n-propyl acetate, dimethylacetate, methyl propionate, ethyl propionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like. Examples of the ketone-based solvent include cyclohexanone and the like. Examples of the aprotic solvent include a nitrile such as X—CN (wherein X is a C2 to C20 linear, branched, or cyclic hydrocarbon, a double bond, an aromatic ring, or an ether bond), an amide such as dimethylformamide, a dioxolane such as 1,3-dioxolane, sulfolane, and the like.

The non-aqueous organic solvent may be used singularly, or as a mixture. When the organic solvent is used as a mixture, the mixture ratio can be controlled in accordance with a desired battery performance.

The carbonate-based solvent may include a mixture of a cyclic carbonate and a linear carbonate. When the cyclic carbonate and the linear carbonate are mixed together, in a volume ratio of from 1:1 to 1:9, and the mixture is used as an electrolyte, the electrolyte performance may be enhanced.

An electrolyte, according to one embodiment of the present invention, may further include a mixture of a carbonate-based solvent and an aromatic hydrocarbon-based solvent. The carbonate-based solvent and the aromatic hydrocarbon-based solvent can be mixed together in a volume ratio of from 1:1 to 30:1.

The aromatic hydrocarbon-based organic solvent may be represented by the following Formula 54:

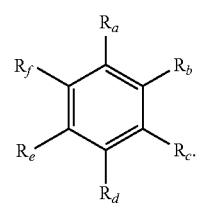

[Chemical Formula 54]

In Chemical Formula 54, $R_a$ to $R_f$ are independently selected from the group consisting of hydrogen, a halogen, a C1 to C10 alkyl, a haloalkyl, and a combination thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further include an additive, such as vinylene carbonate, or a fluoroethylene carbonate-based compound, so as to improve the cycle-life of a battery. The additive may be included in any appropriate amount that improves the cycle-life.

The lithium salt is a lithium ion source in the battery, during normal battery operations. Non-limiting examples of the lithium salt include at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_4$, $LiAlCl_4$, $LiN(C_pF_{2p+1}SO_2)(C_qF_{2q+1}SO_2)$ (where p and q are natural numbers), $LiSO_3CF_3$, LiCl, LiI, lithium bisoxalate borate, and a combination thereof. The lithium salt may be used at from a 0.1 to 2.0M concentration. According to one embodiment, the lithium salt may be used at from a 0.7 to 1.6M concentration. When the lithium salt concentration is less than 0.1M, the performance of an electrolyte may be reduced, due to low electrolyte conductivity, whereas when it is more than 2.0M, lithium ion mobility may be reduced, due to an increase of the viscosity of an electrolyte.

The solid electrolyte may include polyethylene oxide. The solid electrolyte may include a polyorganosiloxane side chain or a polyoxyalkylene side chain. The solid electrolyte may be a sulfide electrolyte, such as $Li_2S$—$SiS_2$, $Li_2S$—$GeS_2$, $Li_2S$—$P_2S_5$, $Li_2S$—$B_2S_3$, or the like. The solid electrolyte may include an inorganic compound, such as $Li_2S$—$SiS_2$—$Li_3PO_4$, $Li_2S$—$SiS_2$—$Li_3SO_4$, or the like.

A separator may be interposed between the positive electrode and the negative electrode. The separator may be one or more layers of a compound selected from the group consisting of polyethylene, polypropylene, and polyvinylidene fluoride. The separator may include multiple different layers, such as polyethylene/polypropylene layers, polyethylene/polypropylene/polyethylene layers, or polypropylene/polyethylene/polypropylene layers.

FIG. 1 shows the structure of a rechargeable lithium battery 100, according to one exemplary embodiment of the present invention. The rechargeable lithium battery 100 includes an electrode assembly 110, a battery case 120 to house the electrode assembly 110, and a cap assembly 140 to seal the case 120. The electrode assembly includes a negative electrode 112, a positive electrode 113, and a separator 114 interposed therebetween. The structure of the rechargeable lithium battery is not limited to the structure illustrated in FIG. 1, for example, it may be a prismatic or pouch-shaped battery.

The following examples illustrate the aspects of the present invention in more detail. However, it is understood that the present invention is not limited by these examples.

Synthesis Example 1

Preparation of High Strength Prepolymer 4,4-oxydiphthalic dianhydride and 4,4-oxyaniline were mixed at a mole ratio of 50:50, in a N-methylpyrrolidone solvent, and polymerized under a nitrogen atmosphere at 90° C., to synthesize a polyamic acid, high strength prepolymer.

Synthesis Example 2

Preparation of High Strength Prepolymer

Pyromellitic dianhydride and hexafluoro 2,2-bis (4,4-aminophenoxyphenyl)propane were mixed at a mole ratio of 50:50, in a N-methylpyrrolidone solvent, and polymerized under a nitrogen atmosphere at 90° C., to synthesize a polyamic acid, high strength prepolymer.

Synthesis Example 3

Preparation of High Strength Prepolymer

Benzophenonetetracarboxyl dianhydride and 1,4-phenylenediamine were mixed at a mole ratio of 50:50, in a N-methylpyrrolidone solvent, and polymerized under a nitrogen atmosphere at 90° C., to synthesize a polyamic acid high strength prepolymer.

Example 1

Preparation of Negative Active Material

The polyamic acid, high strength prepolymer obtained in Synthesis Example 1 was dissolved in N-methylpyrrolidone, to obtain a polymer solution. The polymer solution was uniformly mixed with $Li_{1.1}VO_2$ at a weight ratio of 1:99 of the prepolymer to $Li_{1.1}VO_2$, to mixture. The mixture was dried at 120° C. to remove N-methylpyrrolidone and then subjected to a heat treatment at 200° C. to provide a negative active material. The provided negative active material included 1 wt % of a high strength polymer, which was coated on particles of the $Li_{1.1}VO_2$, to a thickness of 20 nm, so as to form a surface-treatment layer.

Example 2

Preparation of Negative Active Material

The polyamic acid, high strength prepolymer obtained in Synthesis Example 1 was dissolved in N-methylpyrrolidone, to obtain a polymer solution. The polymer solution was uniformly mixed with $Li_{1.1}VO_2$ and a carbon black conductive agent, at a weight ratio of 1:97:2, to provide a mixture. The mixture was heated at 200° C. to provide a negative active material. The provided negative active material included 1 wt % of a high strength polymer, which was coated on particles of the $Li_{1.1}VO_2$ to a thickness of 30 nm, so as to form a surface-treatment layer.

Example 3

Preparation of Negative Active Material

The polyamic acid, high strength prepolymer obtained in Synthesis Example 1 was dissolved in N-methylpyrrolidone, to obtain a polymer solution. The polymer solution was uniformly mixed with $SiO_{1.8}$, at a weight ratio of 1:99 of the prepolymer to $SiO_{1.8}$, to provide a mixture. The mixture was heated at 200° C. to provide a negative active material. The provided negative active material included 1 wt % of a high strength polymer, which was coated on particles of the $SiO_{1.8}$ to a thickness of 15 nm, so as to form a surface-treatment layer.

Example 4

Preparation of Negative Active Material

The polyamic acid, high strength prepolymer obtained in Synthesis Example 1 was dissolved in N-methylpyrrolidone, to obtain a polymer solution. The polymer solution was uniformly mixed with $SiO_{1.8}$, at a weight ratio of 2:98 of the prepolymer to $SiO_{1.8}$, to provide a mixture. The mixture was heated at 200° C. to provide a negative active material. The provided negative active material included 2 wt % of a high strength polymer, which was coated on particles of the $SiO_{1.8}$ to a thickness of 20 nm, so as to form a surface-treatment layer.

Example 5

Preparation of Negative Active Material

The polyamic acid, high strength prepolymer obtained in Synthesis Example 2 was dissolved in N-methylpyrrolidone, to obtain a polymer solution. The polymer solution was uniformly mixed with $SiO_{1.8}$, at a weight ratio of 1:99 of the prepolymer to $SiO_{1.8}$, to provide a mixture. The mixture was heated at 200° C. to provide a negative active material. The provided negative active material included 1 wt % of a high strength polymer, which was coated on particles of the $SiO_{1.8}$ to a thickness of 20 nm, so as to form a surface-treatment layer.

Example 6

Preparation of Negative Active Material

The polyamic acid high, strength prepolymer obtained in Synthesis Example 3 was dissolved in N-methylpyrrolidone to obtain a polymer solution. The polymer solution was uniformly mixed with $Li_{1.1}VO_2$, at a weight ratio of 1:99 of the prepolymer to $Li_{1.1}VO_2$, to provide a mixture. The mixture was heated at 200° C. to provide a negative active material. The provided negative active material included 1 wt % of a high strength polymer, which was coated on particles of the $Li_{1.1}VO_2$ to a thickness of 20 nm, so as to form a surface-treatment layer.

Example 7

Preparation of Negative Active Material $Li_{1.1}VO_2$, polyamideimide, and a denka black conductive agent were mixed at a weight ratio of 95:1:4, in N-methylpyrrolidone, and then dried at 120° C. to provide a negative active material. The provided negative active material included 1 wt % of a high strength polymer, which was coated on particles of the $Li_{1.1}VO_2$ to a thickness of 20 nm, so as to form a surface-treatment layer.

Example 8

Preparation of Negative Active Material $Li_{1.1}VO_2$, polyacrylonitrile, and a carbon black conductive agent were mixed at a weight ratio of 95:1:4, in N-methylpyrrolidone, and then dried at 120° C. to provide a negative active material. The provided negative active material included 1 wt % of a high strength polymer, which was coated on particles of the $Li_{1.1}VO_2$ to a thickness of 15 nm, so as to form a surface-treatment layer.

Example 9

Preparation of Negative Active Material $Li_{1.1}VO_2$, polysulfone, and a carbon black conductive agent were mixed at a weight ratio of 95:1:4 in N-methylpyrrolidone and then dried at 120° C. to provide a negative active material. The provided negative active material included 1 wt % of a high strength polymer, which was coated on particles of the $Li_{1.1}VO_2$ to a thickness of 15 nm, so as to form a surface-treatment layer.

Example 10

Preparation of Negative Active Material $Li_{1.1}VO_2$, polyoxysulfone, and a carbon black conductive agent were mixed at a weight ratio of 95:1:4, in N-methylpyrrolidone, and then dried at 120° C. to provide a negative active material. The provided negative active material included 1 wt % of a high strength polymer, which was coated on particles of the $Li_{1.1}VO_2$ to a thickness of 15 nm, so as to form a surface-treatment layer.

Comparative Example 1

Preparation of Negative Active Material $Li_{1.1}VO_2$ and polyvinylidene fluoride are mixed at a weight ratio of 90:10, in N-methylpyrrolidone, and then dried at 120° C. to provide a negative active material.

Example 11

Fabrication of Rechargeable Lithium Cells

The negative active materials according to Examples 1 to 6, 8 to 10, and Comparative Example 1, were each mixed with polyvinylidene fluoride at a weight ratio of 90:10, in N-methylpyrrolidone, to provide a negative electrode slurry.

Each negative electrode slurry was coated on a copper foil to a thickness of 70 μm, to provide a thin electrode plate, dried at 135° C. for 3 hours or more, and then pressed, to provide a negative electrode including a vanadium oxide negative active material. A $LiCoO_2$ positive active material, polyvinylidene fluoride, and a carbon black conductive agent were mixed at a weight ratio of 92:4:4 and dispersed in an N-methyl-2-pyrrolidone solvent, to provide a positive electrode slurry.

The positive electrode slurry was coated on an aluminum foil at a thickness of 70 μm, to provide a thin electrode plate, dried at 135° C. for 3 hours or more, and pressed to provide a positive electrode.

1.15 M $LiPF_6$ lithium salt was added to a mixed solvent, in which diethyl carbonate (DEC) and ethylene carbonate (EC) were mixed at a volume ratio of 7:3, to provide an electrolyte.

The provided negative electrode and positive electrode were wound with a porous polypropylene film separator and put into a battery can. An electrolyte was inserted into the can, to finish a rechargeable lithium cell. The amount of electrolyte used was 2.7 g.

Example 12

Fabrication of Rechargeable Lithium Cell

A mixture including the negative active material according to Example 7 and artificial graphite (SG-K3) was mixed with polyvinylidene fluoride at a weight ratio of 90:10, in N-methylpyrrolidone, to provide a negative electrode slurry.

The negative electrode slurry was coated on a copper foil to a thickness of 70 μm, to provide a thin electrode plate, dried at 135° C. for 3 hours or more, and then pressed, to provide a negative electrode including a vanadium oxide/artificial graphite negative active material.

A rechargeable lithium cell was fabricated with the same procedure as in Example 1, except for using the negative electrode.

Tensile Strength Measurement on High Strength Polymer

Figure 2:
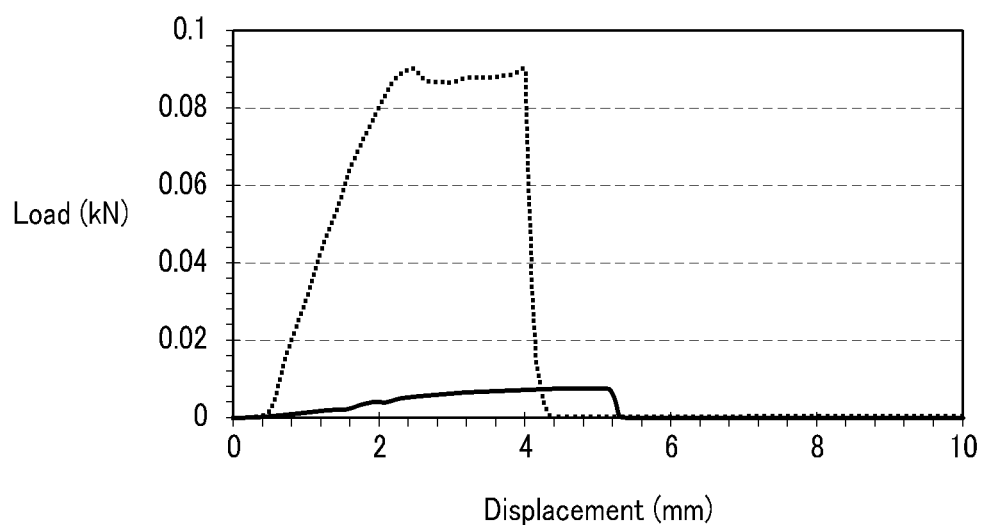
FIG. 2 is a graph showing comparison of tensile strengths of a polyimide polymer according to Synthesis Example 1 and a polyvinylidenefluoride polymer according to Comparative Example 1.

The polyimide polymers obtained from the polyamic acid prepolymers, according to Synthesis Examples 1 to 3, and the polyvinylidene fluoride polymer, according to Comparative Example 1, were applied with a load ranging from 0 to 0.1 KN, and the tensile strengths thereof were measured. The results for the polyimide polymer of Synthesis Example 1 and the polyvinylidene fluoride polymer of Comparative Example 1 are shown in FIG. 2 (dotted line: Synthesis Example 1, solid line: Comparative Example 1).

The polyamideimide, polysulfone, and polyoxysulfone obtained from Examples 7, 9, and 10 were measured for tensile strength and elongation, with respect to initial values, in accordance with the same process. The results are shown in the following Table 1. The following polysulfones (1) to (3) were measured for elongation (%) and tensile strength (MPa), 3 times.

TABLE 1

|  | Elongation (%) | Tensile strength (MPa) |
|---|---|---|
| polyamideimide | 16 | 80 |
| polysulfone (1) | 12.1 | 63.71 |
| polysulfone (2) | 13.09 | 63.53 |
| polysulfone (3) | 12.95 | 63.62 |
| polyoxysulfone | 11.31 | 71.14 |

Referring to FIG. 2, the polyimide high strength polymer, according to Synthesis Example 1, had excellent tensile strength at an average of 94 MPa. On the other hand, the polyvinylidene fluoride polymer, according to Comparative Example 1, had an excessively low tensile strength, ranging from 22 to 35 MPa. Further, as shown in Table 1, the polyamideimide, polysulfone, and polyoxysulfone polymer, according to Examples 7, 9, and 10, had high tensile strengths, at an average of 63 MPa or more.

Electrode Expansion Rate Measurement

Cells, including the negative active materials according to Examples 1 to 10 and Comparative Example 1, were applied with a pressure of 40 psi, and were charged and discharged at 2 C, as a battery formation process. Then, the charging and discharging was performed at 2 C, as a standard process. Subsequently, the cells were disassembled, and the negative electrode plates were washed with dimethylcarbonate.

Each washed electrode plate was dried at room temperature, and the electrode thickness was measured with a micrometer and compared with the initial electrode thickness, to calculate the electrode expansion rate. The results for Example 7 and Comparative Example 1 are shown in the following Table 2.

TABLE 2

|  | Electrode expansion ratio after charge (%) |
|---|---|
| Example 7 | 15% |
| Comparative Example 1 | 80% |

Referring to Table 2, it was confirmed that the surface-treatment layer, including the high strength polymer according to Example 7, had a remarkably lower electrode expansion rate than the surface-treatment layer including the polyvinylidene fluoride polymer according to Comparative Example 1. It was confirmed that electrode expansion was suppressed, due to the high strength polymer. In addition, similar effects were confirmed for Examples 1 to 6 and Examples 8 to 10.

SEM Photograph Evaluation

Figure 3:
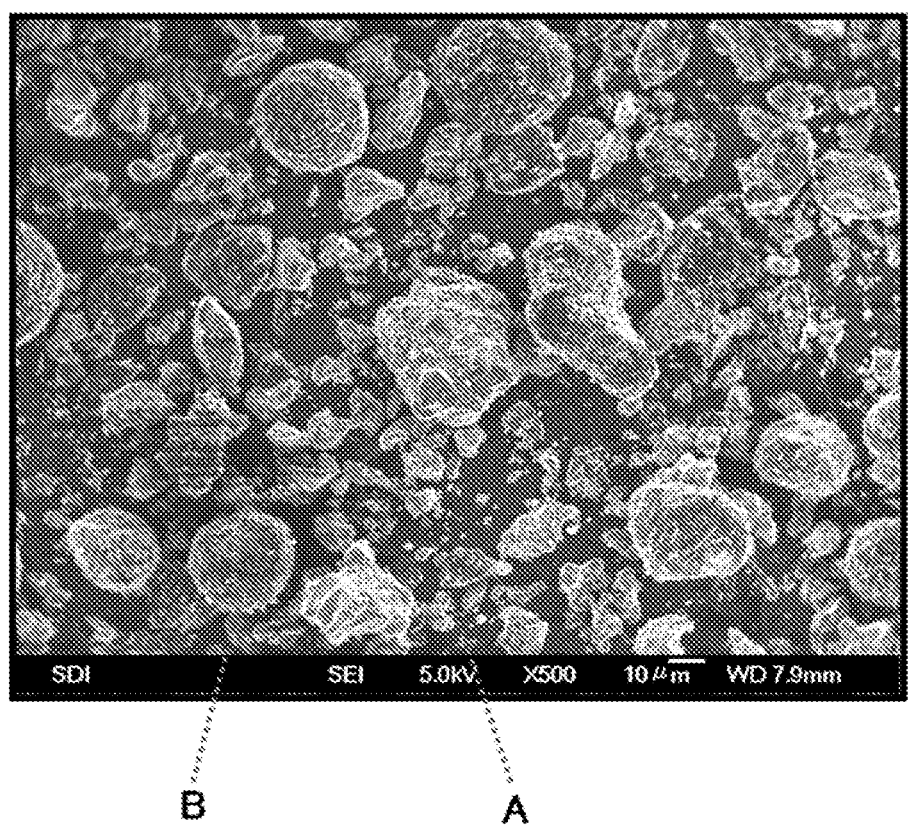
FIG. 3 and FIG. 4 are respectively 500× and 3000×SEM photographs of the negative active material according to Example 7.
Figure 4:
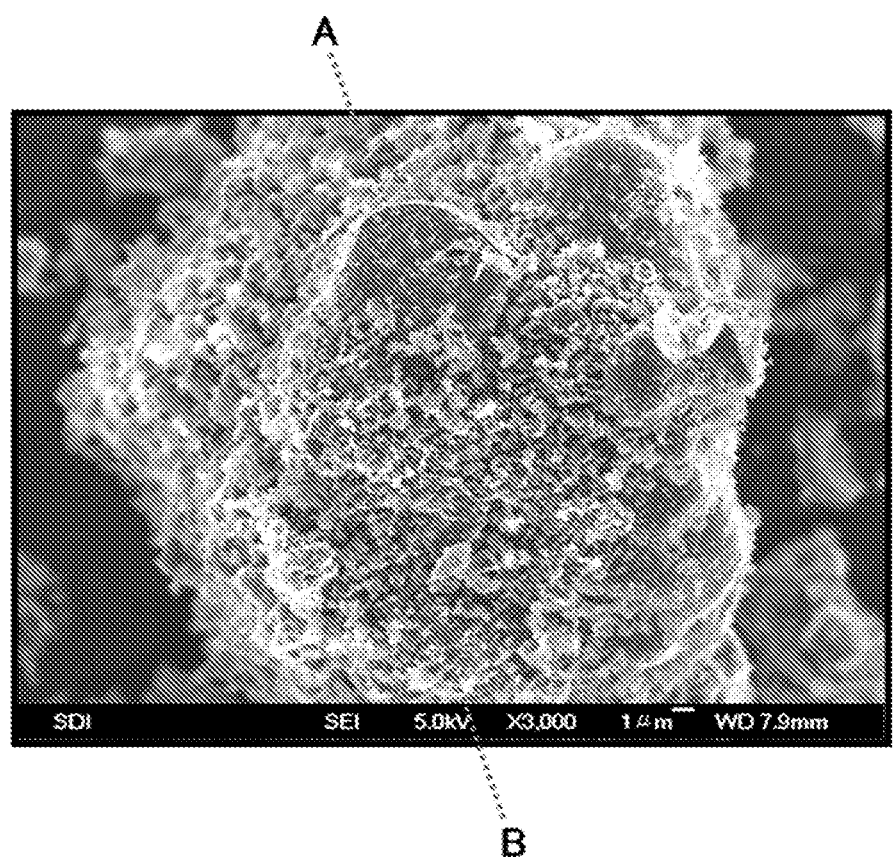

The negative active materials of Examples 1 to 10 were evaluated with a SEM photographs. FIG. 3 shows a 500×SEM photograph of the negative active material of Example 7, and FIG. 4 shows a 3000×SEM photograph of the negative active material of Example 7. In FIG. 3, A indicates artificial graphite, and B indicates the $Li_{1.1}VO_2$ active material. In FIG. 4, A indicates the $Li_{1.1}VO_2$ active material, and B indicates the active material core coated with a surface-treatment layer including denka black (B) and polyamideimide. Referring to FIG. 3 and FIG. 4, the negative active material according to Example 7 had an active material core coated with a surface-treatment layer including denka black (B) and polyamideimide.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A negative active material for a rechargeable lithium battery, comprising:
   an active material comprising a polymer having a tensile strength of at least 40 MPa substantially uniformly mixed therewith;
   and a separator,
   wherein the polymer is a compound selected from the group consisting of the following Chemical Formulae:

[Chemical Formula 2]

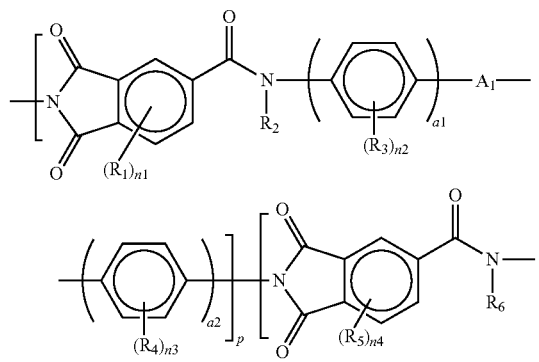

-continued

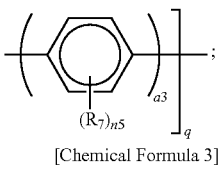
[Chemical Formula 3]

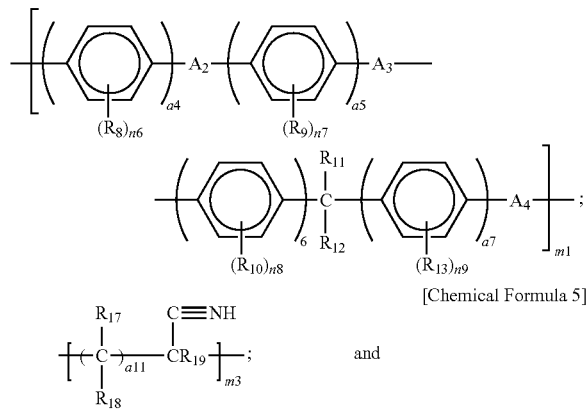
[Chemical Formula 5]

wherein, $R_1$ to $R_{19}$ are independently selected from the group consisting of hydrogen, an alkyl, a haloalkyl, an alkoxy, acrylic acid including Li or Na, an aryl, and a halogen, $A_1$ to $A_7$ are independently selected from the group consisting of O, CO, $SO_2$, and $CR_{41}R_{42}$, where $R_{41}$ and $R_{42}$ are independently an alkyl, a haloalkyl, or phenyl, $n_1$ and $n_4$ are independently from 1 to 3, $n_2$, $n_3$, and $n_5$ to $n_{12}$ are independently from 1 to 4, $a_1$ to $a_{11}$ are independently from 1 to 5, p and q independently range from 0.01 to 0.99, and $m_1$ to $m_3$ independently range from 100 to 10,000;

wherein the active material is selected from the group consisting of: a lithium vanadium-based oxide, a tin oxide ($SnO_x$, $0 \leq x \leq 2$), a silicon oxide ($SiO_x$, $0<x<2$), and a combination thereof.

2. The negative active material of claim 1, wherein the polymer has a tensile strength ranging from 40 to 200 MPa.

3. The negative active material of claim 1, wherein the polymer has a tensile strength ranging from 50 to 150 MPa.

4. The negative active material of claim 1, wherein the polymer has a weight average molecular weight ranging from 10,000 to 1,000,000.

5. The negative active material of claim 1, wherein the negative active material comprises 0.1 to 2 wt % of the polymer.

6. The negative active material of claim 1, wherein the polymer is coated to an average thickness ranging from 1 to 100 nm.

7. The negative active material of claim 1, wherein the negative active material has a volume expansion ratio ranging from 15 to 40 volume %.

8. The negative active material of claim 7, wherein the negative active material has a volume expansion ratio ranging from 20 to 30 volume %.

9. The negative active material of claim 1, further comprising a conductive material included in the polymer.

10. The negative active material of claim 9, wherein the conductive material is a carbonaceous material.

11. A negative electrode for a rechargeable lithium battery, comprising: a current collector; and a negative active material layer disposed on the current collector, comprising, a active material, a polymer having a tensile strength of at least 40 MPa substantially uniformly mixed with the active material, and a binder;

wherein the polymer is a compound selected from the group consisting of the following Chemical Formulae:

[Chemical Formula 2]

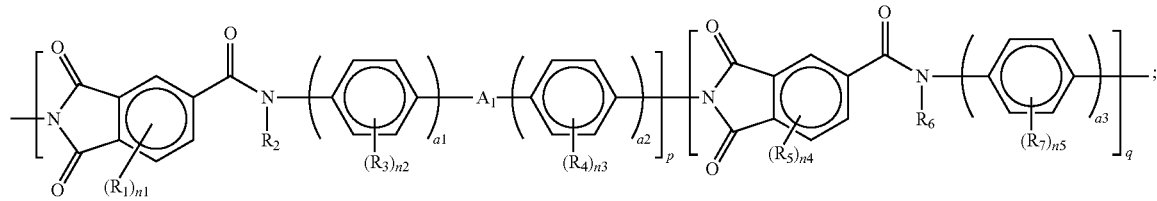

[Chemical Formula 3]

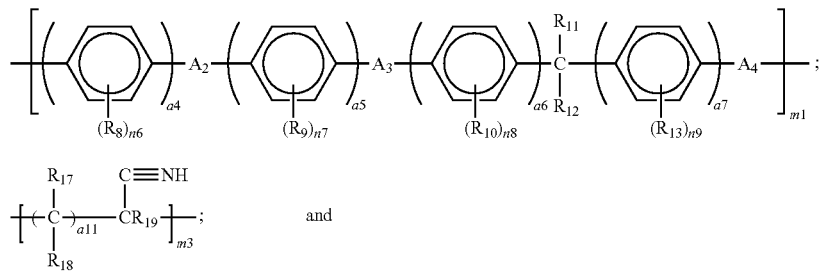

[Chemical Formula 5]

wherein, $R_1$ to $R_{19}$ are independently selected from the group consisting of hydrogen, an alkyl, a haloalkyl, an alkoxy, acrylic acid including Li or Na, an aryl, and a halogen, $A_1$ to $A_7$ are independently selected from the group consisting of O, CO, $SO_2$, and $CR_{41}R_{42}$, where $R_{41}$ and $R_{42}$ are independently an alkyl, a haloalkyl, or phenyl, $n_1$ and $n_4$ are independently from 1 to 3, $n_2$, $n_3$, and $n_5$ to $n_{12}$ are independently from 1 to 4, $a_1$ to $a_{11}$ are independently from 1 to 5, p and q independently range from 0.01 to 0.99, and $m_1$ to $m_3$ independently range from 100 to 10,000;

wherein the active material is selected from the group consisting of: a lithium vanadium-based oxide, a tin oxide ($SnO_x$, $0 \leq x \leq 2$), a silicon oxide ($SiO_x$, $0<x<2$), and a combination thereof.

12. The negative electrode of claim 11, wherein the polymer has a tensile strength ranging from 40 to 200 MPa.

13. The negative electrode of claim 12, wherein the polymer has a tensile strength ranging from 50 to 150 MPa.

an active material comprising a polymer having a tensile strength of at least 40 MPa substantially uniformly mixed therewith, and
a binder;
a positive electrode including a positive active material capable of reversibly intercalating lithium ions; and
an electrolyte;
wherein the polymer is a compound selected from the group consisting of the following Chemical Formulae:

[Chemical Formula 2]

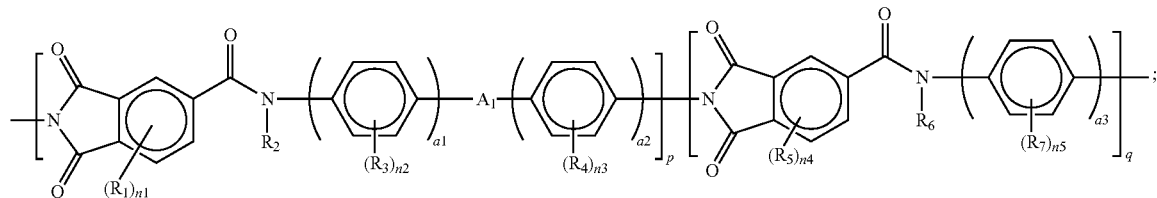

[Chemical Formula 3]

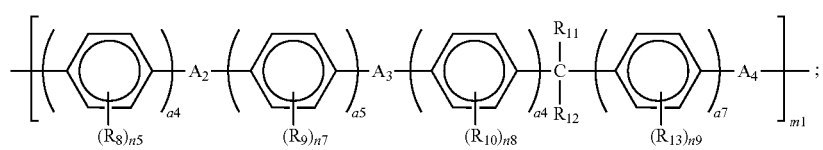

[Chemical Formula 5]

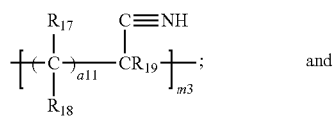

and

14. The negative electrode of claim 11, wherein the polymer has a weight average molecular weight ranging from 10,000 to 1,000,000.

15. The negative electrode of claim 11, wherein the negative active material comprises 0.1 to 2 wt % of the polymer.

16. The negative electrode of claim 11, wherein the polymer is coated to an average thickness ranging from 1 to 100 nm.

17. The negative electrode of claim 11, further comprising a conductive material included in the polymer.

18. The negative electrode of claim 17, wherein the conductive material is a carbonaceous material.

19. The negative electrode of claim 11, wherein the negative electrode has a volume expansion ratio ranging from 10 to 30 volume %.

20. The negative electrode of claim 19, wherein the negative electrode has a volume expansion ratio ranging from 10 to 20 volume %.

21. A rechargeable lithium battery comprising:
a negative electrode comprising
a current collector, and
a negative active material layer disposed on the current collector, comprising, wherein, $R_1$ to $R_{19}$ are independently selected from the group consisting of hydrogen, an alkyl, a haloalkyl, an alkoxy, acrylic acid including Li or Na, an aryl, and a halogen, $A_1$ to $A_7$ are independently selected from the group consisting of O, CO, $SO_2$, and $CR_{41}R_{42}$, where $R_{41}$ and $R_{42}$ are independently an alkyl, a haloalkyl, or phenyl, $n_1$ and $n_4$ are independently from 1 to 3, $n_2$, $n_3$, and $n_5$ to $n_{12}$ are independently from 1 to 4, $a_1$ to $a_{11}$ are independently from 1 to 5, p and q independently range from 0.01 to 0.99, and $m_1$ to $m_3$ independently range from 100 to 10,000;

wherein the active material is selected from the group consisting of: a lithium vanadium-based oxide, a tin oxide ($SnO_x$, $0 \leq x \leq 2$), a silicon oxide ($SiO_x$, $0<x<2$), and a combination thereof.

* * * * *

UNITED STATES PATENT AND TRADEMARK OFFICE
CERTIFICATE OF CORRECTION

PATENT NO. : 8,529,801 B2
APPLICATION NO. : 12/243319
DATED : September 10, 2013
INVENTOR(S) : Nam-Soon Choi et al.

It is certified that error appears in the above-identified patent and that said Letters Patent is hereby corrected as shown below:

On the Title Page

Page 1, Column 2, Line 27 (Item 56, Under Other Publications), Change "GmdH," to --GmbH,--.

Page 1, Column 2, Line 37 (Item 56, Under Other Publications), Change "recieved" to --received--.

In the Specifications

Column 2, Line 10, Change "Publication" to --Publication No.--.

Column 8, Line 46, Change "n3" to --$n_3$,--.

Column 8, Line 57, Change "C(CF3)2" to --$C(CF_3)_2$.--.

Column 14, Line 3, Change "raction" to --reaction--.

Column 14, Line 25, Change "$S_2 \downarrow$ Immidization by heating" to --$S_2 \downarrow$ Imidization by heating--.

Column 15, Line 62, Change "hydroxypropy" to --hydroxypropyl--.

Column 16, Line 42, Change "2:" to --2;--.

Column 16, Line 54, Change "$0 \leq \alpha \leq 2$;" to --$0 < \alpha \leq 2$;--.

Column 16, Line 62, Change "$0 < c \leq 0.05$," to --$0 \leq c \leq 0.05$,--.

Column 17, Line 7, Change "$Li_aCOG_bO_2$," to --$Li_aCoG_bO_2$,--.

Column 17, Line 32, Change "$Li_{3-f}J_3(PO_4)_3$ ($0 \leq f \leq 3$);" to --$Li_{3-f}J_2(PO_4)_3$ ($0 \leq f \leq 3$); and--.

Column 18, Lines 20-21, Change "methyl propionate, ethyl propionate," to --methylpropionate, ethylpropionate,--.

Column 20, Line 33, Change "to" to --to provide a--.

Signed and Sealed this
Twentieth Day of May, 2014

Michelle K. Lee
*Deputy Director of the United States Patent and Trademark Office*

CERTIFICATE OF CORRECTION (continued)
U.S. Pat. No. 8,529,801 B2

In the Claims

Column 25, Lines 8-18, In Claim 1, Change

" 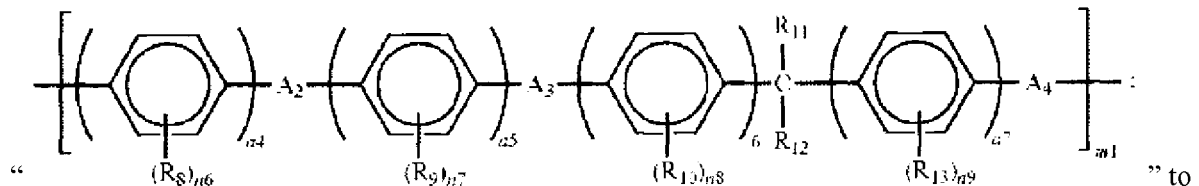 " to

-- 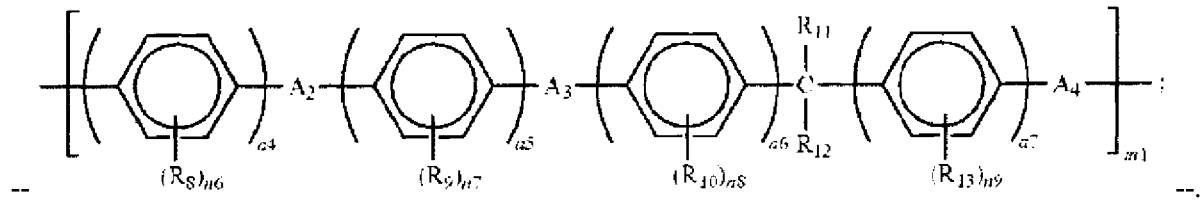 --.

Column 25, Lines 19-24, In Claim 1, Change

" 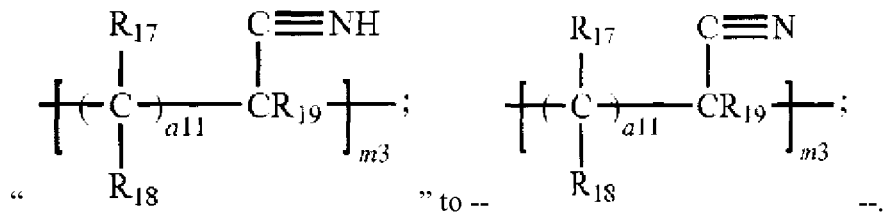 " to -- 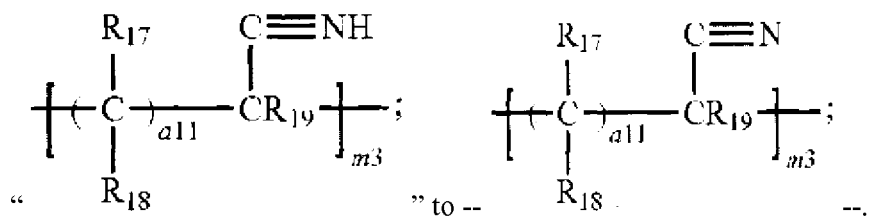 --.

Columns 25-26, Lines 46-53, In Claim 11, Change

" 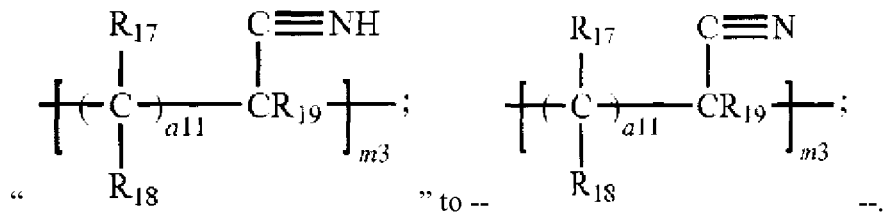 " to -- 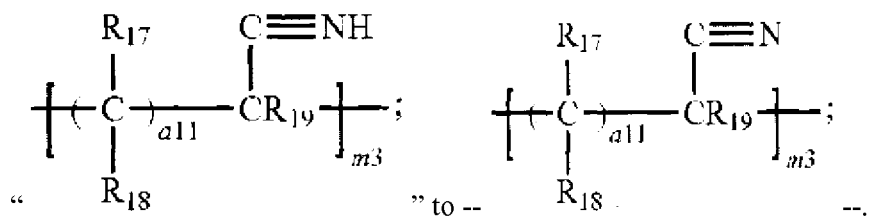 --.

Columns 27-28, Lines 25-34, In Claim 21, Change

" 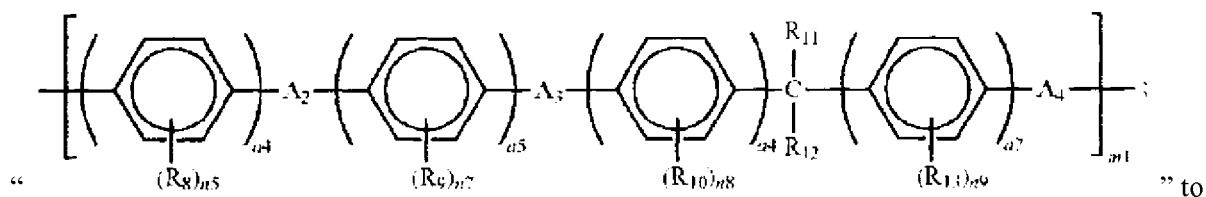 " to

-- 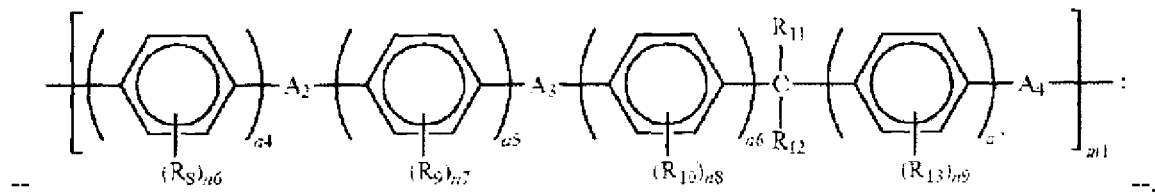 --.

Columns 27-28, Lines 35-42, In Claim 21, Change "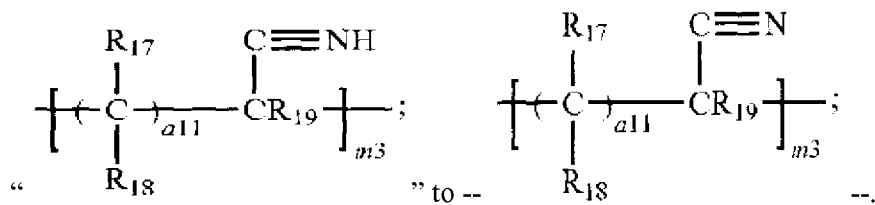" to --  --.